3,282,170
PISTON ASSEMBLY FOR VARIABLE DISPLACE-
MENT PUMP AND THE LIKE
Tom H. Thompson, Daytona Beach, Fla., assignor to
Daytona Thompson Corporation, Daytona Beach, Fla.,
a corporation of Florida
Filed July 16, 1964, Ser. No. 383,110
14 Claims. (Cl. 92—84)

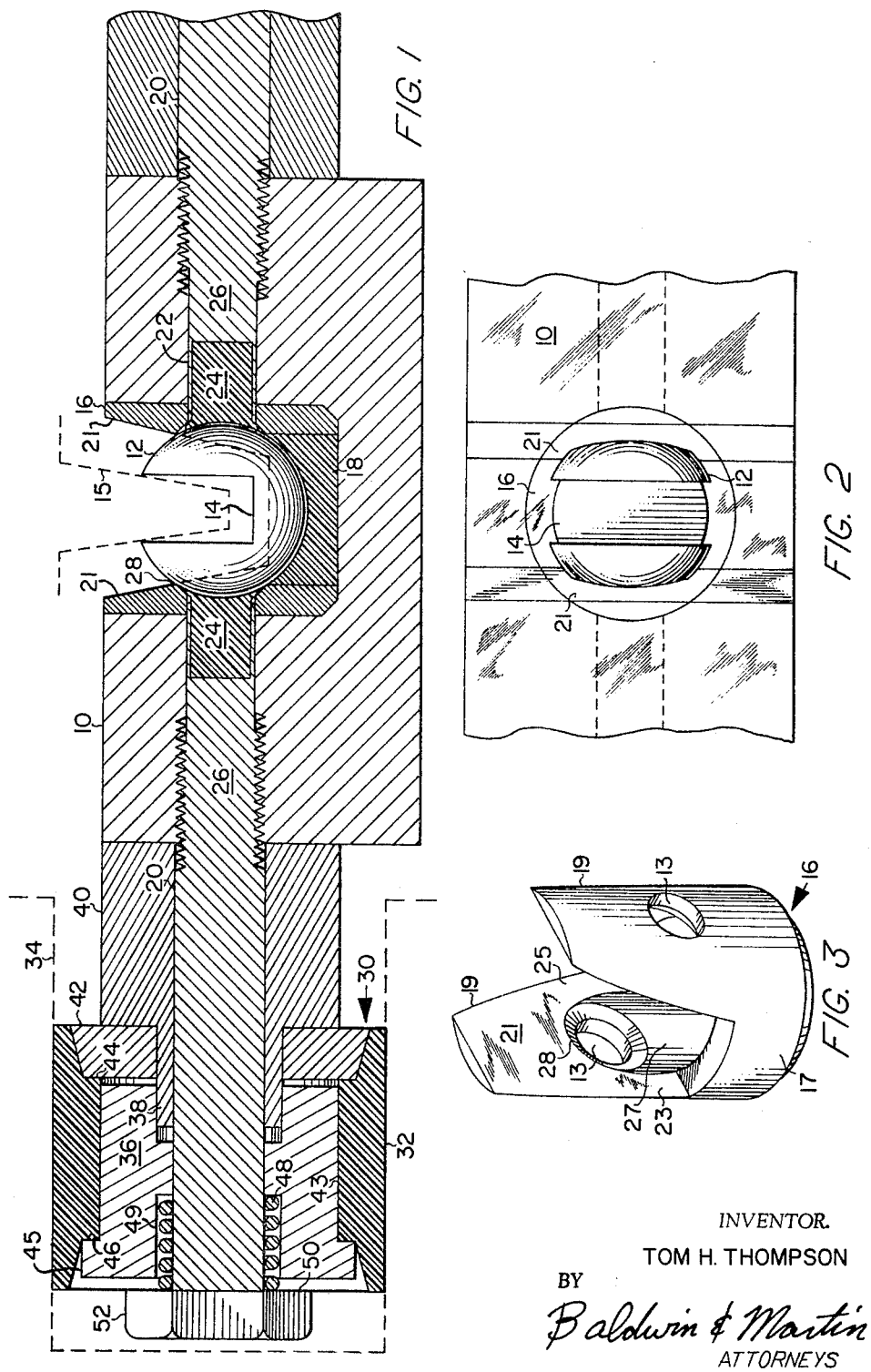

This invention relates to a novel and improved ball and socket driving connection particularly adapted for use in piston assemblies for variable displacement pumps and the like.

Ball and socket driving connections are used in a variety of devices, for example in a variable displacement pump such as shown in my copending application S.N. 285,507 filed June 4, 1963, now Patent No. 3,227,095, a ball socket and socket joint is used in association with each of a plurality of double acting piston assemblies. In this type, as well as other types of variable displacement pumps or the like, the ball and socket connection between the piston and the swash or wobble plate normally require lubrication, particularly where the device is operated at high pressures. Conventionally, this has been accomplished by providing clearance between the ball and its seat and by providing oil passages leading to the clearance space for introducing lubricating fluid therein. Where clearance is provided between the ball and its seat for lubrication purposes, even though such clearance is relatively small, there will be some play between the ball and socket with attendant noise and possibly vibration during operation of the pump. Also, any foreign material in the fluid being handled may tend to obstruct the lubricating passages and reduce, if not eliminate, lubrication of the bearing surfaces of the ball and socket connection.

Accordingly, it is the object of the present invention to provide a novel and improved ball and socket driving connection which is self-lubricating, which will permit selectively adjustable preloading of the ball, and which is of relatively simple and economical construction yet which is sufficiently rugged to provide extended trouble-free use.

It is a further object of the present invention to provide a novel and improved piston assembly for a variable displacement pump which will provide increased wear resistance and reduced operating friction in the overall piston assembly and which will provide quieter operation and less vibration.

The objects of the invention are achieved in one aspect thereof comprising a double-acting piston assembly including a central body member having opposite ends on which are supported a pair of built-up pistons maintained in assembly by a pair of support members threadably engaged in the body. The body is provided with a cylindrical opening extending laterally of and generally between the ends of the support members. A tubular ball retainer is received within the opening in the body and is provided with a pair of aligned openings in its side wall in which the inner ends of the support members are engaged, thereby maintaining the retainer in assembly in the body. A ball is rotatably received within the retainer and is seated on a bearing within the lower end of the retainer. The ball is supported laterally of the retainer by a pair of bearing members extending through the side openings in the retainer. The side bearing members are carried by the inner ends of the support members whereby inward threading of the support members will provide firm engagement between the side bearings and the ball. Thus, the support members not only maintain the pistons and ball retainer in assembly on the body, but also the support members may be threaded inwardly sufficiently to provide a pre-loading of the ball and elimination of substantially all bearing noise and vibration in the ball and socket joint during operation of the pump.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIG. 1 is a longitudinal, fragmentary, cross-sectional view of a double-acting piston incorporating the present invention;

FIG. 2 is a fragmentary, top view of a portion of FIG. 1; and

FIG. 3 is an isometric view of an element of FIG. 1.

With reference to the drawing the novel ball and socket joint of this invention is shown in association with a novel double-acting piston for use with a variable displacement pump such as that of my aforementioned copending application. The piston comprises a rigid body 10 having a generally rectangular cross-section. The body 10 is provided with a circular cross-sectioned recess or opening extending inwardly of the body from the top surface thereof. The longitudinal axis of the opening extends at right angles to the longitudinal axis of the body and preferably through the center of the body. Disposed within the recess is a ball 12. The ball is provided with a notch or recess 14 of generally rectangular cross-section extending across the ball and to a depth beyond the center of the ball. The sides of the notch are parallel and disposed on opposite sides of the center of the ball. As will later be apparent, the provision of the notch or recess 14 facilitates assembly of the ball into its retaining structure as the notch serves to provide the ball with a portion having a width as measured along a line extending through the ball center and centrally between the sides of the notch which is less than the diameter of the ball. The notch 14 also serves to receive a driving or driven member such as an annular web on the wobble of a pump; for example, as shown in my aforementioned copending application and illustrated in broken lines in FIG. 1.

The ball is retained within the body 10 by a tubular retainer 16 which fits closely within the recess in the body. The inner portion or bottom of the ball is seated on a bearing member 18. The bearing 18 has cylindrical side walls fitting closely within a lower cylindrical portion 17 of the retainer 16 and a flat bottom face seated on the bottom of the recess receiving the retainer. The upper or outwardly facing surface of the bearing 18 is parti-spherical having a radius of curvature corresponding to that of the ball 12. The bearing 18 is preferably fabricated from a fluorcarbon such as Teflon, however other bearing materials may be used.

The retainer 16 is provided with a pair of aligned, diametrically opposed side openings 13 which are aligned with the support members 20. Each of the support members 20 has a reduced diameter end portion 22 slidably received within openings in the body 10 which are aligned with and of generally the same diameter as the side openings 13 in the retainer 12. Each reduced end portion 22 of the support members has a cylindrical cavity at its inner end next adjacent the ball with the cavity extending coaxially of the support members. Disposed in each of the cavities at the ends of the support members 20 is a generally cylindrical plug 24 of a fluorcarbon having a low coefficient of friction, such as Teflon, although other bearing material could be used. Each plug 24 fits closely within the cavity in the end of the respective support member and extends beyond the inner end of the support member 20 for engagement with the ball. At least a portion of the reduced diameter inner end of each support member 20 is engaged within the respective aligned side opening in the ball retainer 16, thus preventing rotation or axial movement of the retainer relative to the body.

Each of the reduced end portions 22 of the support members terminates at its outer end in an externally threaded portion 26 on the support member 20. The openings in the body 10 receiving the reduced end portions of the support members each terminates at its outer end in an internally threaded portion engaged with the threaded portions 26 of the support member, whereby inward or outward threading of the support members will vary the pre-loading or compressive engagement between the ball and bearings 24. The plugs 24 may be provided with ball engageable ends which are dished or concave so as generally to correspond to the spherical surface of the ball 12. When the bearings 24 are of deformable cold flowable material, for example Teflon, the ball engageable ends of the plugs 24 may be initially flat with the support members 20 being threaded inwardly sufficiently to conform the ball engageable ends of the plugs to the spherical surface of the ball.

The ball retainer 16 is provided with a generally U-shaped notch extending completely across the upper or outer end thereof with the bottom of the notch being disposed below the center of the ball and closely adjacent but spaced above the uppermost surface of the bearing 18. As shown in FIGS. 1 and 3, the sides of the notch in the retainer are defined by a pair of inclined planes converging inwardly from the upper end of the retainer. The spacing of the planes is such that the upper or outer end of the notch has a width greater than the inner diameter of the lower cylindrical end 17 of the retainer while the lower or inner end of the notch has a width smaller than the inner diameter of the cylindrical portion 17. Thus, the notch divides the retainer into a pair of upstanding members 19 integral with and extending upwardly from the cylindrical portion 17 and spaced angularly about the axis of the cylindrical portion in diametrically opposed relation. With particular reference to FIG. 3, each upstanding member 19 comprises a generally arcuate cross-sectional portion extending from the cylindrical portion 17 and at its upper end terminating and merging into a segmentally cross-sectional portion. The segmentally cross-sectioned portion has a planar surface 21 lying in a plane defining one side of the U-shaped notch in retainer. The arcuate cross-sectioned portion has a pair of coplanar, spaced apart surfaces 23, 25 which are a continuation of the planar surface 21. The surfaces 23, 25 are joined by an arcuate surface 27 which is a continuation of the inner cylindrical wall of the cylindrical portion 17 of the retainer and is defined by arcs progressively decreasing in length from the juncture of the surface 27 with the cylindrical portion 17 to a point of disappearance where the surfaces 23, 25 merge into the planar surface 21.

The aligned side openings 13 in the retainer extend through the upstanding members with their axes intersecting at the axis of the cylindrical portion 17 and above the bottom of the notch in the retainer. The inner end of each opening 13 is enlarged as by chamfering the inner wall of the upstanding member surrounding the opening. The ball is partially received within the enlarged ends of the openings 13 with the upper bordering edge of the inner end of the enlarged portion forming lips 28 which are in overlying engagement with the ball. The lower bearing 18 is preferably slightly oversize in a direction longitudinally of the retainer, and relative to the ball diameter, to assure that the ball will be in engagement with the lips 28. The lips 28 serve to retain the ball within the retainer but do not contribute significantly to any rotational support of the ball; rather, essentially all of the rotatable support for the ball is provided by the bearings 18 and 24. The chamfers surrounding the inner ends of the side openings in the retainer also provide clearance between the ball and the retainer to accommodate any radially outward deformation of the bearings 24 when these bearings are of a deformable material. The engagement of the lips 28 with the ball also serve to prevent any extrusion of the material of the bearings 24 upwardly between the retainer and the ball when the bearings are of a cold flowable material such as Teflon.

The ball is assembled in the one piece retainer prior to inserting the retainer in the body 10. In assembling the ball and retainer the ball is turned so that the bottom of the notch 14 in the ball is generally parallel to one of the planar surfaces 21 of the retainer. As the ball is inserted into the open end of the retainer, the portion thereof forming the outer end of one side of the notch 14 is partially inserted into the next adjacent side opening 13 in the retainer thus permitting the ball to be moved laterally of the retainer sufficiently that the ball will clear the opposite side of the retainer. The ball may then be turned and simultaneously moved inwardly of the retainer until the ball engages the bearing 18. The ball is then further rotated until the notch 14 extends upwardly. During the latter portion of the rotation of the ball during assembly the ball will be engaged by the lips 28 on the upstanding members 19 necessitating some deformation of the seat 18 in order to rotate the ball sufficiently to bring the notch into vertical position. The ball will then be firmly retained within the retainer. The chamfer at the inner end of each of the side openings 13 in the retainer may under certain conditions result in play between the ball and retainer were it not for the bearing 18; however, the bearing 18, as noted above, is slightly oversize in order to assure that the ball will be in engagement with the lips 28 when assembled in the retainer as described. Where there would otherwise be play between the ball and retainer the elimination of the same by the bearing 18 will result in the center of the ball being displaced slightly upwardly of the axes of the side openings 13 in the retainer and thus the longitudinal axes of the support members 20 and bearings 24.

As clearly shown in FIG. 1 the support members 20 not only serve to pre-load the bearings 24 against the ball 12 but also serve to retain a built-up piston assembly generally indicated at 30, in assembly with the piston 10. In the embodiment shown in FIG. 1 a piston assembly 30 is supported at each end of the body 10; however only one such assembly is shown it being understood that another identical assembly is provided at the rightward end of the body 10 as shown in FIG. 1. The piston assembly 30 comprises a tubular member or piston 32 preferably fabricated from a fluorcarbon, just as Teflon. The piston 32 has an outer cylindrical surface adapted to be slidably engaged within the cylinder of a cylinder block or rotor such as shown in broken line at 34. The piston 32 has a cylindrical bore within which is received a generally cylindrical retaining or clamping member 36. The clamping member 36 has a cylindrical bore coaxially and slidably receiving the outer end portion of the support member 20. The inner end of the retaining member 36 is counterbored for the reception of an annular projection or boss 38 extending coaxially of a bore in a spacer block 40 disposed between the retainer 36 and body 10 and engaged over the support member 20. Disposed between the retainer 36 and block 40 is a generally annular member 42 having a central opening fitted over the boss 38 of the block 40 and engaged with an end surface on the block 40 facing axially of the support member 20 toward the outer end thereof.

The outer or peripheral surface of the annular member 42 is tapered toward the retainer 36 and fits closely within one end of the piston 32. In this connection the bore of the piston terminates at each end in a radially outwardly extending annular surface which in turn terminates at the lesser diameter end of a frusto-conical recess disposed coaxially of the piston. The annular member 42 has its outer peripheral surface shaped complementally to the frusto-conical recess in the end of the piston within which the annular member 42 is received, and one end of the annular member abuts the shoulder provided by the radially extending surface of the piston as at 44. The retainer 36 is provided at its outer end with a radially outwardly extending flange forming a shoulder, as at 46, facing axially of the piston 32 and engageable with the shoulder of the piston extending between the inner cylindrical wall of the cylinder and the inner end of the frusto-conical enlargement of the cylinder bore. The retainer 36 is urged inwardly of the piston 32 to clamp the annular projection 43 extending radially inwardly of the piston member between the flange 45 on retaining member and the portion of the annular member 42 engaged with the other end of the piston member. At the same time the spacer block 40 is clamped between the body 10 and the annular member 42. The retaining member 36 is urged inwardly of the piston by a coil spring 48 received within a counterbore in the retaining member 36 and disposed about the outer end portion of the support member 20. The spring 48 is engaged at one end with the bottom of the counterbore 49 and at the other end with a radially outwardly extending shoulder 50 on the outer end of the support member 20. The shoulder 50 is spaced from the outer end of the retaining member 36 to permit inward threading of the support member 20 to adjust the pre-loading of the bearing 24 without interference with the outer end of the retaining member 36. As seen in FIG. 1 the outer end of the support member is provided with a tool engageable portion 52 to facilitate inward and outward threading of the support member 20.

Thus it will be seen that there has been provided a novel and improved piston assembly particularly adapted for use in a variable displacement pump. While the ball and socket joint of this invention has been described in the environment of the piston illustrated, it will be understood that this aspect of the invention has utility in many other environments. Therefore, while only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a piston assembly for a variable displacement pump and the like, a body, a piston assembly disposed at one end of the body and comprising a plurality of elements in assembly, a support member threadably mounted on said body and maintaining said elements in said assembly, a ball and socket connection carried by the body and including a ball retainer disposed in an opening in the body, a ball received in said retainer, the retainer being provided with a pair of openings disposed on opposite sides of the ball, a pair of bearing members at least partially received respectively within said openings, said support member acting upon one of said bearing members to maintain the same in engagement with the ball, and a second threaded member engaged in said body and acting on the other bearing member to engage the same with the ball.

2. In a piston assembly for a variable displacement pump and the like, a body, a piston assembly at one end of the body comprising a plurality of elements in assembly, a support member threadably mounted on said body and maintaining said elements in assembly, a ball and socket connection carried by the body and including a ball retainer disposed within an opening in the body, a ball received in said retainer, the retainer having aligned side openings disposed on opposite sides of the ball, means on said support member engaged in one of said side openings, a bearing member disposed between the inner end of the support member and the ball, a second bearing member disposable at least partially within the other side opening and an adjustable member mounted on said body for movement coaxially of the other side opening, said second bearing member being engaged between said adjustable member and said ball.

3. In a piston assembly for a variable displacement pump and the like, a body, a piston assembly disposed at one end of the body and comprising a plurality of elements in assembly, a support member threadably mounted on said body and maintaining said elements in said assembly, a ball and socket connection carried by the body and including a ball retainer disposed in an opening in the body, a ball received in said retainer, the retainer being provided with a pair of aligned side openings disposed on opposite sides of the ball, said support member being engaged in one of said openings, a threaded second member engaged in said body and engaged in the other side opening, and a pair of bearing members engaged between the inner ends of said support member and second member and their respective sides of said ball and each of said bearing members having a ball contacting surface conforming to the surface of the ball, said support member and second member being movable inwardly and outwardly of said body to vary the force exerted on the ball by said bearing members.

4. In a pistol assembly for a variable displacement pump and the like, a body, having a cylindrical opening in one side thereof, a generally cylindrical relatively rigid ball retainer received in said opening, the ball retainer being provided with a generally U-shaped notch extending diametrically thereacross and having a bottom portion spaced upwardly from the inner end of said retainer and sides tapering inwardly from the outer end of the retainer, said notch dividing the retainer in a pair of upstanding members extending integrally from a lower cylindrical portion, said upstanding portions being provided with a pair of aligned side openings the axes of which are spaced upwardly from said cylindrical portion, a bearing received within said cylindrical portion and bottomed in said opening, a ball received within said retainer and seated on said bearing, the ball being provided with a notch, the inner ends of said side openings being enlarged and having inner bordering edge portions in overlying engagement with the ball on the side thereof opposite said bearing, a pair of support members threadably engaged in said body and each having an end portion engaged in one of said side openings, each of said support members having a cavity in the end thereof next adjacent said ball, a plug of non-metallic deformable bearing material having a relatively low coefficient friction and having the characteristic of providing self-lubrication being engaged between said one end of each of said threaded members and the ball, each support member being threaded inwardly of said body sufficiently to deform the ball contacting face of said plug to conform the same generally to the shape of the ball, a piston assembly disposed at one end of said body and comprising a generally cylindrical piston of non-metallic material having a relatively low coefficient friction, one support member extending outwardly of said body and coaxially of said piston, a pair of clamping members supported by said one support member and clampingly engaging said piston therebetween, and means on said one support member engageable with one of said clamping members to move the same toward the other in response to inward threading of said one support member, said one clamping member having a recess disposed coaxially of said support member, and a coil spring disposed in said recess and acting between said one support member and said clamping member to provide a force on said one clamping member tending to move the same toward the other clamping member in response to inward threading of said one support member.

5. In a ball and socket joint, a unitary ball retainer having a ball receiving socket therein generally surrounding the ball, a ball supported in and rotatably received in said socket of said retainer, said retainer having a plurality of side openings spaced generally circumferentially about the ball, a plurality of bearing members received respectively in said side openings for movement generally radially of the ball, and selectively adjustable means acting upon said bearing members to exert a force thereon in the direction of said ball.

6. In a ball and socket joint, a ball, a rigid socket generally surrounding and supporting said ball for rotation therein, a plurality of generally cylindrical non-metallic deformable bearing members disposed about the ball within openings extending through said socket and extending generally radially of said ball, each bearing member being engaged at one end of the ball, and adjustable means acting on each of said bearing members to provide a force thereon in the direction of the ball sufficient to conform said one end of the bearing members generally to the spherical surface of the ball.

7. In a ball and socket joint, a ball, support means generally surrounding and supporting the ball for rotation therein, said support means having a plurality of openings disposed about the ball with the axis of the opening intersecting at a line passing through the center of the ball, a plurality of deformable bearing members received in said openings for movement longitudinally thereof, the bearing members engaging the ball with the ball contacting surfaces of the bearing members generally conforming to the spherical surfaces of the ball so as to at least partially provide the rotatable support for the ball, and adjustable means acting on at least one of said bearing members to provide a force thereon in a direction of said ball.

8. In a ball and socket joint, a one piece rigid nondeformable ball retainer comprising a hollow cylindrical portion at one end and a plurality of upstanding members integral with and extending coaxially of and from said cylindrical portion, said upstanding members being spaced angularly about the axis of said cylindrical portion, and a ball rotatably received in said retainer, the upstanding members each having a portion overlying said ball on the side thereof opposite said one end of the retainer, said upstanding members defining a vertically extending opening therebetween the lateral dimension thereof being less than the diameter of the ball generally throughout the vertical extent of said opening from adjacent said cylindrical portion to said upstanding member portions overlying said ball, the ball including an inwardly directed recess to permit said ball to pass between said upstanding member portions which overlie said ball when said ball assumes its received position in said retainer, said ball having a diameter greater than the internal diameter of said cylindrical portion.

9. In a ball and socket joint, a ball retainer comprising a cylindrical portion at one end and a plurality of upstanding members integral with and extending upwardly from said cylindrical portion, said upstanding members being spaced angularly about the axis of said cylindrical portion and each being provided with an opening therethrough extending radially of said axis, and a ball rotatably received in said retainer, the upstanding members each having a portion bordering said opening therein which is in overlying relation to the ball on the side thereof opposite said one end of the retainer, the ball having a diameter greater than that of said cylindrical portion and having a recess extending radially inwardly thereof.

10. In a ball and socket joint, a generally tubular one piece ball retainer having a cylindrical portion at one end and a plurality of upstanding members integral with and extending upwardly from said cylindrical portion and spaced angularly about the axis of said cylindrical portion, each upstanding member having a generally arcuate cross-sectioned portion extending from and forming a continuation of a portion of said cylindrical portion, each arcuate cross-sectioned portion terminating at its upper end in and merging into a segmentally cross-sectioned portion having a planar surface inclined away from said axis toward the other end of the retainer and facing generally toward said axis, the upstanding members having openings therethrough with the axes of the openings extending radially of and intersecting at said axis, and a ball rotatably received within said retainer partially within said cylindrical portion and partially within said openings in the upstanding members, the bordering edge portions of the said openings in the upstanding members next adjacent said axis overlying the ball on the side thereof opposite said one end of the retainer, the ball being provided with a recess having parallel sides disposed on opposite sides of the center of the ball thereby providing the ball with a width as measured along a line extending through the ball center and midway between said sides of said recess which is less than the diameter of the ball.

11. In a ball and socket joint, a ball retainer comprising a cylindrical portion at one end and a plurality of upstanding members integral with and extending upwardly from said cylindrical portion and spaced angularly about the axis of said cylindrical portion, each upstanding member having an arcuate cross-sectioned portion extending upwardly from said cylindrical portion, each arcuate portion at its upper end merging into a segmentally cross-sectioned portion generally facing toward said axis with the inner surface thereof being inclined outwardly of said axis from said arcuate cross-sectioned portion, each upstanding member being provided with an opening therethrough, with the axis of the openings intersecting at said axis, a ball rotatably received in said retainer, a plurality of bearing members respectively received in said openings and engaged with said ball, and means acting on said bearing members and exerting a force thereon in the direction of the ball including means for varying the force exerted by said bearing members on the ball, each upstanding member having a portion overlying said ball on the side thereof opposite said one end of the retainer, the ball having a radius greater than that of said cylindrical portion and said arcuate cross-sectioned portions.

12. In a ball and socket joint a generally tubular ball retainer having a cylindrical portion at one end and a plurality of upstanding members integral with and extending coaxially with and from said cylindrical portion in angularly spaced relation about the axis of said cylindrical portion, each upstanding member having a generally arcuate cross-sectioned portion extending from said cylindrical portion and terminating at its upper end in a segmentally cross-sectioned portion having an inwardly facing planar surface inclined from said arcuate cross section portion outwardly of said axis, the upstanding members being provided with openings therethrough having axes extending radially of and intersecting at said axis, a ball rotatably received within said retainer partially within said cylindrical portion and partially within the inner ends of said openings, a plurality of bearing members respectively received in said openings and engaged at one end with the ball, each bearing member being fabricated from a non-metallic cold flowable material having a low coefficient of friction, a plurality of threaded members respectively associated with said bearing members, means mounting the threaded members for movement longitudinally of the bearing members, each threaded member acting on the associated bearing member to exert a force thereon sufficient to conform the ball contacting end of the bearing member generally to the ball surface, and a non-metallic resiliently deformable bearing disposed in said cylindrical portion in seating contact with the ball and urging the ball into contact with the inner bordering edge portions of said openings on the side of the ball opposite said one end of the retainer.

13. In a ball and socket joint a body having a cylindrical recess therein, a generally tubular ball retainer closely fitting in said recess, said retainer comprising a cylindrical portion at its inner end and a plurality of upstanding members extending integrally from and spaced angularly about the axis of said cylindrical portion, the upstanding members having openings extending therethrough with the axes of the openings extending radially of and intersecting at said axis, a ball rotatably received within said retainer and generally between said openings, a bearing member disposed within each of said openings and engaged with the ball, and a plurality of support members threadably mounted on said body and respectively associated with said bearing members, each of said support members being movable longitudinally of the respective openings in an upstanding manner and being slidably engaged in said opening, the support member acting on the respectively associated bearing member to exert a force thereon in the direction of the ball.

14. In a ball and socket joint, a body having a cylindrical opening, a generally cylindrical one piece retainer closely fitting in said opening, a ball received in said retainer, said retainer being provided with a U-shaped notch extending diametrically across one end of the retainer and inwardly of the retainer beyond the center of the ball, the sides of said notch being defined by inclined planes converging inwardly of said one end of the retainer, the outer end of the notch having a width greater than the inner diameter of said retainer, the width of the inner end of the notch being less than the inner diameter of the retainer, said notch dividing the retainer into a pair of upstanding members integral with and extending upwardly from a cylindrical portion, the upstanding members having aligned openings the axes of which extend diametrically of said cylindrical portion, each of said openings having an enlarged opening at its inner end, the ball being partially received in said cylindrical portion and the enlarged portions of said openings, a pair of adjustable members threadably mounted on said body and respectively extending coaxially of and engaged within said aligned openings, a pair of non-metallic deformable bearing members respectively engaged between said adjustable members and the ball, and a resiliently deformable non-metallic third bearing member disposed within said cylindrical portion, said third bearing member providing a spherical seat for the ball and urging the ball into engagement with the bordering edge portions of the inner ends of said enlarged portions of said aligned openings on the side of said openings next adjacent one end of the retainer.

References Cited by the Examiner

UNITED STATES PATENTS

| | | | |
|---|---|---|---|
| 1,195,122 | 8/1916 | Wilt | 287—90 X |
| 1,759,109 | 5/1930 | Graves | 287—87 X |
| 2,845,030 | 7/1958 | Febvre et al. | 103—173 X |

FOREIGN PATENTS

| | | |
|---|---|---|
| 1,322,001 | 2/1963 | France. |
| 722,661 | 7/1942 | Germany. |
| 725,724 | 3/1955 | Great Britain. |

MARTIN P. SCHWADRON, *Primary Examiner.*

SAMUEL LEVINE, EDGAR W. GEOGHEGAN, *Examiners.*

IRWIN C. COHEN, *Assistant Examiner.*